US012372206B2

(12) United States Patent
Park

(10) Patent No.: US 12,372,206 B2
(45) Date of Patent: Jul. 29, 2025

(54) CAP ASSEMBLY

(71) Applicants: Hyundai Motor Company, Seoul (KR); Kia Corporation, Seoul (KR)

(72) Inventor: Jung Jun Park, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 170 days.

(21) Appl. No.: 18/159,420

(22) Filed: Jan. 25, 2023

(65) Prior Publication Data

US 2024/0102616 A1 Mar. 28, 2024

(30) Foreign Application Priority Data

Sep. 28, 2022 (KR) ........................ 10-2022-0123597

(51) Int. Cl.
*F17C 13/04* (2006.01)
*F17C 13/06* (2006.01)

(52) U.S. Cl.
CPC .............. *F17C 13/04* (2013.01); *F17C 13/06* (2013.01); *F17C 2205/0332* (2013.01); *F17C 2205/0394* (2013.01); *F17C 2221/012* (2013.01); *F17C 2265/066* (2013.01); *F17C 2270/0168* (2013.01)

(58) Field of Classification Search
CPC .. F17C 13/04; F17C 13/06; F17C 2205/0332; F17C 2205/0394; F17C 2221/012; F17C 2265/066; F17C 2270/0168
USPC .................... 220/203.13, 367.1; 215/21, 307
See application file for complete search history.

(56) References Cited

U.S. PATENT DOCUMENTS 2,681,075 A * 6/1954 Welden ................... A47J 27/09 126/388.1
3,414,003 A * 12/1968 Wyckoff ................. F16K 24/06 137/533.19
4,043,473 A * 8/1977 Webb ..................... B65D 49/02 215/21
5,285,736 A * 2/1994 Sturniolo ............... F23M 11/00 432/242
7,337,916 B2 * 3/2008 Clougherty .......... B65D 81/343 229/125.17
2013/0276408 A1 * 10/2013 Huo ........................ B65B 17/00 53/440

* cited by examiner

*Primary Examiner* — James N Smalley
(74) *Attorney, Agent, or Firm* — Fish & Richardson P.C.

(57) ABSTRACT

A cap assembly includes a retainer member provided at an outlet end of a discharge line through which a target fluid is discharged to the outside in a gravitational direction, the retainer member having a guide hole configured to guide the target fluid to the outside, a cap member configured to be movable from a first position at which the cap member closes the guide hole to a second position at which the cap member opens the guide hole in accordance with a discharge pressure of the target fluid, and a weight member provided in the cap member and configured to apply a load to the cap member so that the cap member moves to the first position when the discharge pressure applied to the cap member by the target fluid is eliminated.

20 Claims, 8 Drawing Sheets

CAP ASSEMBLY

CROSS-REFERENCE TO RELATED APPLICATION

This application claims priority to and the benefit of Korean Patent Application No. 10-2022-0123597, filed in the Korean Intellectual Property Office, on Sep. 28, 2022, the entire contents of which are incorporated herein by reference.

TECHNICAL FIELD

The present disclosure relates to a cap assembly, and more particularly, to a cap assembly capable of effectively protecting an outlet end of a discharge line while ensuring a stable discharge of a target fluid through a discharge line.

BACKGROUND ART

A fuel cell electric vehicle (FCEV) produces electrical energy from an electrochemical reaction between oxygen and hydrogen in a fuel cell stack and uses the electrical energy as a power source.

The fuel cell electric vehicle may continuously generate electricity, regardless of a capacity of a battery, by being supplied with fuel and air from the outside, and thus has high efficiency, and emits almost no contaminant. By virtue of these advantages, continuous research and development is being conducted on the fuel cell electric vehicle.

A plurality of hydrogen tanks is provided in the fuel cell electric vehicle, and hydrogen is stored in the hydrogen tanks along a hydrogen charging line of a cap assembly. The hydrogen stored in the hydrogen tanks is depressurized by a regulator, supplied to the fuel cell stack along a hydrogen supply line, and then used to produce electrical energy.

A thermally activated pressure relief device (TPRD) and a pressure relief valve (PRV) may be provided in an outlet of the hydrogen tank. The TPRD may forcibly discharge hydrogen to the outside when a temperature of the hydrogen tank increases (e.g., when a temperature is increased by a fire), and the PRV may remove overpressure in the hydrogen tank. The hydrogen discharged from the hydrogen tanks may be discharged to the outside through a single integrated discharge line.

In some cases, an outlet of the discharge line is manufactured to be directed upward (into the air in the gravitational direction) to meet the regulations that a direction of a discharge of hydrogen through the discharge line should not be directed toward a passenger's residence space and the hydrogen tank. Further, the regulations prescribe that an outlet end of the discharge line should be protected by a separate protection device such as a cap (or a closure).

However, in the related art, after the cap for protecting the outlet end of the discharge line is detached from the outlet end of the discharge line once (after the cap is detached from the outlet end of the discharge line and then hydrogen is discharged through the discharge line), the cap is hardly returned to a closed position at which the cap closes the outlet end of the discharge line. For this reason, there is a problem in that the outlet end of the discharge line is exposed directly to the outside in an opened state in which the outlet end of the discharge line cannot be protected by the cap.

In particular, rainwater, foreign substances, and the like may be introduced through the outlet end of the discharge line that is opened upward, which causes problems in that corrosion and malfunction may occur and safety and reliability deteriorate.

Therefore, recently, various studies have been conducted to effectively protect the outlet end of the discharge line while ensuring a stable discharge of a target fluid through the outlet end of the discharge line, but the study results are still insufficient. Accordingly, there is a need to develop a technology to effectively protect the outlet end of the discharge line while ensuring a stable discharge of a target fluid through the outlet end of the discharge line.

SUMMARY

The present disclosure has been made in an effort to provide a cap assembly capable of effectively protecting an outlet end of a discharge line while ensuring a stable discharge of a target fluid through the outlet end of the discharge line.

In particular, the present disclosure has been made in an effort to stably protect the outlet end of the discharge line without performing a separate additional assembling process after the outlet end of the discharge line is opened once.

Among other things, the present disclosure has been made in an effort to enable a cap member to move by its own weight to a position at which the cap member autonomously closes a discharge line again when the target fluid is completely discharged through the outlet end of the discharge line.

The present disclosure has also been made in an effort to prevent a loss of the cap member.

The present disclosure has also been made in an effort to improve safety and reliability while inhibiting foreign substances from being introduced into the discharge line.

The objects to be achieved by the implementations are not limited to the above-mentioned objects, but also include objects or effects that may be understood from the solutions or implementations described below.

According to one aspect of the subject matter described in this application, a cap assembly includes: a retainer member provided at an outlet end of a discharge line through which a target fluid is discharged to the outside in a gravitational direction, the retainer member having a guide hole configured to guide the target fluid to the outside; a cap member configured to be movable from a first position at which the cap member closes the guide hole to a second position at which the cap member opens the guide hole in accordance with a discharge pressure of the target fluid; and a weight member provided in the cap member and configured to apply a load to the cap member so that the cap member moves to the first position when the discharge pressure applied to the cap member by the target fluid is eliminated.

This is to effectively protect the outlet end of the discharge line while ensuring a stable discharge of the target fluid through the discharge line.

In the related art, after the cap for protecting the outlet end of the discharge line is detached from the outlet end of the discharge line once (after the cap is detached from the outlet end of the discharge line and then hydrogen is discharged through the discharge line), the cap is hardly returned to a closed position at which the cap closes the outlet end of the discharge line. For this reason, there is a problem in that the outlet end of the discharge line is exposed directly to the outside in an opened state in which the outlet end of the discharge line cannot be protected by the cap. In particular, rainwater, foreign substances, and the like may be introduced through the outlet end of the discharge line that is opened upward, which causes problems in that corrosion and malfunction may occur and safety and reliability deteriorate.

However, the cap member is configured to selectively open or close the outlet end of the discharge line, and the cap member is autonomously moved by the weight of the cap member back to the position at which the cap member closes the discharge line without performing a separate additional assembling process when the target fluid is completely discharged (the discharge pressure applied to the cap member by the target fluid is eliminated). Therefore, it is possible to obtain an advantageous effect of effectively protecting the outlet end of the discharge line while ensuring the stable discharge of the target fluid.

In particular, it is possible to obtain an advantageous effect of preventing the outlet end of the discharge line from being exposed directly to the outside in an opened state in which the outlet end of the discharge line cannot be protected by the cap member after the target fluid is discharged through the discharge line. Further, it is possible to obtain an advantageous effect of inhibiting rainwater and foreign substances from being introduced through the outlet end of the discharge line.

In some implementations, the retainer member may include: a sealing member having the guide hole and provided in the discharge line, the sealing member being configured to be elastically compressible and expandable; and a retainer guide configured to cover a bottom surface of the sealing member.

The cap member may have various structures capable of moving from the first position at which the cap member closes the guide hole to the second position at which the cap member opens the guide hole in accordance with the discharge pressure of the target fluid.

In some implementations, the cap member may include: a cap body configured to be rectilinearly movable from the first position to the second position along the guide hole; and a discharge hole provided in the cap body and configured to communicate with the guide hole and be selectively exposed to the outside of the retainer member in response to the rectilinear movement of the cap body.

In some implementations, the discharge hole may be closed by an inner wall surface of the guide hole when the cap member is moved to the first position, and the discharge hole may be emerged to the outside of the guide hole and exposed to the outside of the retainer member when the cap member is moved to the second position.

In some implementations, the cap assembly may include: a cap head provided at an upper end of the cap body and having a cross-sectional area larger than the guide hole.

As described above, the cap head is provided at the upper end of the cap body, and the cap head is restricted by an upper surface of the retainer member when the cap member is moved to the first position. Therefore, it is possible to obtain an advantageous effect of stably maintaining an arrangement state of the cap member disposed at the first position and inhibiting the cap member from separating downward from the retainer member.

In some implementations, the cap assembly may include: a cap leg provided at a lower end of the cap body and configured to be restricted by a bottom surface of the retainer member, the cap leg being configured to prevent the cap member from separating from the retainer member when the cap member is moved from the first position to the second position.

The cap leg may have various structures capable of preventing the cap member from separating upward from the retainer member.

In some implementations, the cap leg may include: a leg main body connected to the lower end of the cap body and accommodated in the guide hole; and a leg protrusion provided at an end of the leg main body and configured to be restricted by the bottom surface of the retainer member.

In some implementations, the cap assembly may include: a fluid contact surface provided on the retainer guide and configured to come into contact with the target fluid and press the sealing member toward an inner surface of the discharge line. The fluid contact surface allows the discharge pressure made by the target fluid to press (compress) the sealing member toward the inner surface of the discharge line, such that the retainer member may be more securely supported on the inner surface of the discharge line.

The fluid contact surface may have various structures capable of coming into contact with the target fluid.

In some implementations, the retainer guide may include: a vertical guide portion disposed in the gravitational direction; and an inclined guide portion connected to an end of the vertical guide portion so as to be inclined with respect to the vertical guide portion and configured to define the fluid contact surface.

As described above, the retainer guide includes the vertical guide portion and the inclined guide portion, and the fluid contact surface is defined only on the vertical guide portion, such that the pressure applied to the retainer guide may be concentrated on the vertical guide portion and the sealing member may be effectively pressed against the inner surface of the discharge line. Therefore, it is possible to more securely and stably support the arrangement state of the retainer member.

Moreover, because the inclined guide portion is provided in the retainer guide, a force applied to the retainer guide in the vertical direction (the upward/downward direction) may be minimized (dispersed). Therefore, it is possible to obtain an advantageous effect of more stably maintaining the arrangement state of the retainer member while inhibiting the separation of the retainer member caused by the force applied to the retainer guide in the vertical direction.

In some implementations, the retainer guide may include only the inclined guide portion, which is inclined with respect to the gravitational direction and configured to define the fluid contact surface, without having a separate vertical guide portion.

In some implementations, the cap assembly may include: a fitting tube connected to the outlet end of the discharge line, and the retainer member may be provided in the fitting tube.

As described above, the separate fitting tube is provided at the outlet end of the discharge line, and the retainer member is provided in the fitting tube. Therefore, it is possible to easily couple the retainer member to the discharge line without changing the structure of the discharge line or replacing the discharge line.

In some implementations, the cap assembly may include: a restriction protrusion provided on the outlet end of the discharge line or an inner surface of the fitting tube; and a restriction groove provided in the retainer member and configured to accommodate the restriction protrusion.

Because the restriction protrusion is accommodated in the restriction groove as described above, it is possible to obtain an advantageous effect of minimizing the movement (separation) of the retainer member relative to the fitting tube (the outlet end of the discharge line) and more securely supporting the arrangement state of the retainer member.

In some implementations, the cap assembly may include: a fastening member fastened to the outlet end of the discharge line or the fitting tube and configured to restrict an upper surface of the retainer member.

As described above, the upper surface of the retainer member is restricted by the fastening member fastened (fixed) to the outlet end of the discharge line or the fitting tube. Therefore, it is possible to inhibit the movement (separation) of the retainer member relative to the outlet end of the discharge line or the fitting tube and more securely support the arrangement state of the retainer member.

In some implementations, the cap assembly may include: a stopper protrusion provided at the outlet end of the discharge line or an end of the fitting tube and configured to restrict an upper surface of the retainer member.

In some implementations, the cap assembly may include: an extension tube portion extending from the outlet end of the discharge line or an upper end of the fitting tube and configured to guide the target fluid, which has passed through the cap member, upward from the retainer member.

Because the extension tube portion is provided at the outlet end of the discharge line or the upper end of the fitting tube as described above, the target fluid having passed through the discharge hole may be guided upward. Therefore, it is possible to meet the regulations associated with the discharge direction of the target fluid (e.g., hydrogen).

In some implementations, the cap assembly may include a ventilation hole provided in the extension tube portion.

As described above, the ventilation hole is provided in the extension tube portion, such that the ventilation hole may minimize the amount of moisture or water remaining between the cap member and the extension tube portion in the state in which the cap member is disposed at the first position (the state in which the cap member closes the guide hole). Therefore, it is possible to obtain an advantageous effect of preventing the cap member from being frozen by moisture.

DETAILED DESCRIPTION

Figure 1:
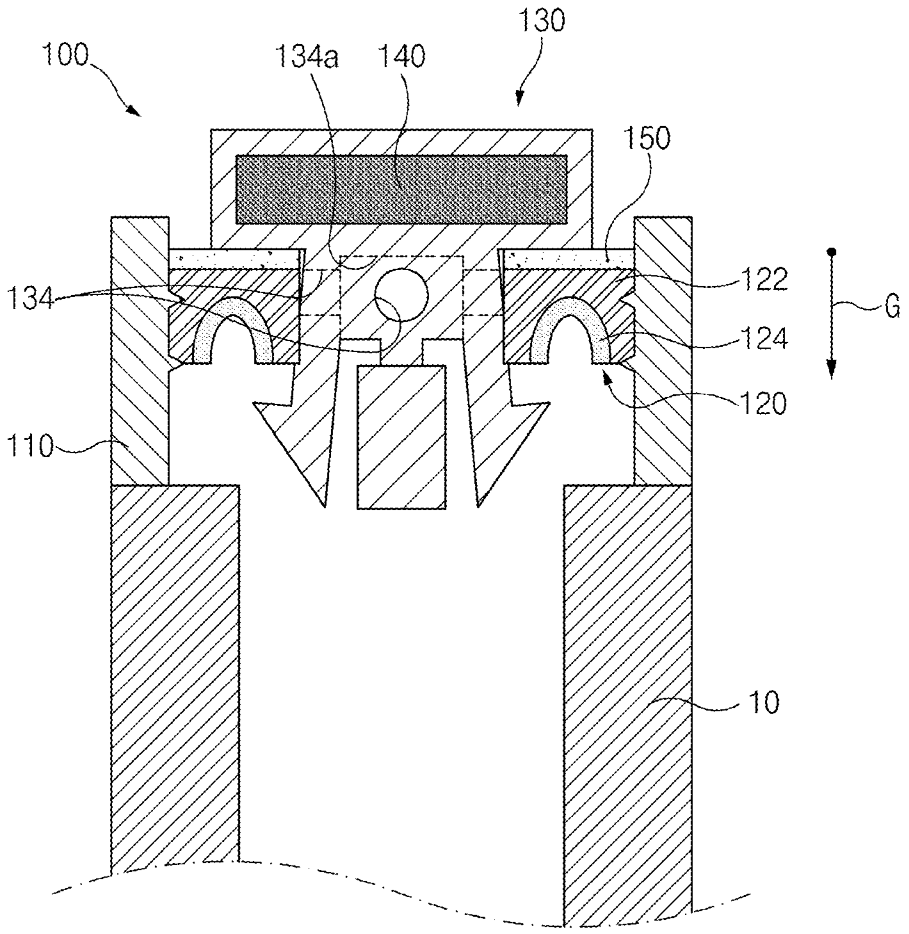
FIG. 1 is a view showing an example of a cap assembly.

Hereinafter, exemplary implementations of the present disclosure will be described in detail with reference to the accompanying drawings.

Referring to FIGS. 1 to 8, in some implementations, a cap assembly 100 includes: a retainer member 120 provided at an outlet end of a discharge line 10 through which a target fluid is discharged to the outside in a gravitational direction G, the retainer member 120 having a guide hole **120*a* configured to guide the target fluid to the outside; a cap member 130 configured to be movable, in accordance with a discharge pressure P of the target fluid, from a first position at which the cap member 130 closes the guide hole 120*a* to a second position at which the cap member 130 opens the guide hole 120*a*; and a weight member 140 provided in the cap member 130 and configured to apply a load to the cap member 130 so that the cap member 130 moves to the first position when the discharge pressure P applied to the cap member 130** by the target fluid is eliminated.

In some implementations, the cap assembly 100 may be applied to the outlet end of the discharge line 10 through which the target fluid may be discharged to the outside. The present disclosure is not restricted or limited by the type and properties of the target fluid discharged along the discharge line 10.

For example, the cap assembly 100 may be applied to the outlet end of the discharge line 10 through which hydrogen discharged from a storage container (e.g., a hydrogen tank) is discharged to the outside.

In some implementations, the discharge line 10 may have various structures capable of discharging hydrogen stored in the storage container to the outside in the gravitational direction (upward/downward direction) G. The present disclosure is not restricted or limited by the structure and shape of the discharge line 10.

Hereinafter, an example will be described in which the discharge line 10 has the outlet end having an approximately straight shape. In some implementations, the outlet end of the discharge line may have a curved shape or other shapes.

Further, the storage container connected to the discharge line 10 may be variously changed in number in accordance with conditions and design specifications. The present disclosure is not restricted or limited by the number of storage containers. For example, a plurality of storage containers may be connected in parallel to the discharge line 10, and hydrogen discharged from the storage containers may be discharged to the outside along the discharge line 10.

In some implementations, the cap assembly 100 may include a fitting tube 110 connected to the outlet end of the discharge line 10, and the retainer member 120 may be provided in the fitting tube 110.

As described above, the separate fitting tube 110 is provided at the outlet end of the discharge line 10, and the retainer member 120 is provided in the fitting tube 110. Therefore, it is possible to easily couple the retainer member 120 to the discharge line 10 without changing the structure of the discharge line 10 or replacing the discharge line 10.

Hereinafter, an example will be described in which the retainer member 120 is coupled to the discharge line 10 by the fitting tube 110 connected to the outlet end of the discharge line 10.

The fitting tube 110 may be provided at the outlet end of the discharge line 10, and hydrogen flowing along the discharge line 10 may be discharged to the outside via the fitting tube 110.

For example, the fitting tube 110 may be provided in the form of a hollow tube having a circular cross-section. In some implementations, the fitting tube may have a quadrangular cross-section shape or other cross-sectional shapes.

The fitting tube 110 may be connected to the outlet end of the discharge line 10 by a method such as coupling (fastening), welding, or the like. The present disclosure is not restricted or limited by the connection structure of the fitting tube 110.

The retainer member 120 is provided in the fitting tube 110 and supports the cap member 130 on the fitting tube 110. The guide hole **120*a* is provided in the retainer member 120** and guides the target fluid (e.g., hydrogen) to the outside.

The retainer member 120 may have various structures having the guide hole 120*a*. The present disclosure is not restricted or limited by the structure of the retainer member 120.

In some implementations, the retainer member 120 may include: a sealing member 122 having the guide hole 120*a* and provided in the fitting tube 110, the sealing member 122 being configured to be elastically compressible and expandable; and a retainer guide 124 configured to cover a bottom surface of the sealing member 122.

For example, the sealing member 122 may be provided in the form of an approximately circular ring having the guide hole 120*a* provided at a central portion thereof. The sealing member 122 may be disposed to continuously surround an inner peripheral surface of the fitting tube 110.

The sealing member 122 may be made of a typical elastic material such as elastomer, rubber, or silicone that is elastically compressible and expandable. The present disclosure is not restricted or limited by the material and properties of the sealing member 122.

The retainer guide 124 is integrated with a bottom surface of the sealing member 122 while covering the bottom surface of the sealing member 122 and supports the sealing member 122.

For example, the retainer guide 124 may be integrated with the bottom surface of the sealing member 122 by dual injection molding. Alternatively, the retainer guide may be attached to the bottom surface of the sealing member or coupled to the bottom surface of the sealing member by a separate fastening member.

The retainer guide 124 may be made of a metallic material such as steel or aluminum having elasticity. In some implementations, the retainer guide may be made of synthetic resin or other materials.

The retainer guide 124 may have various structures capable of covering the bottom surface of the sealing member 122. The present disclosure is not restricted or limited by the structure and shape of the retainer guide 124.

For example, the retainer guide 124 may have an approximately "U" shape and partially cover the bottom surface of the sealing member 122. In some implementations, the retainer guide may have a straight shape or other shapes. Alternatively, the retainer guide may cover the entire bottom surface of the sealing member.

In accordance with the discharge pressure P of the target fluid, the cap member 130 may move from the first position at which the cap member 130 closes the guide hole 120*a* to the second position at which the cap member 130 opens the guide hole 120*a*.

More specifically, the target fluid is discharged along the discharge line 10 in the state in which the cap member 130 is disposed at the first position to close the guide hole 120*a* (the state in which the discharge of the target fluid through the guide hole is blocked). Therefore, when the discharge pressure P is applied to the bottom surface of the cap member 130 by the target fluid, the cap member 130 may move (upward) to the second position at which the cap member 130 opens the guide hole 120*a*.

The cap member 130 may have various structures capable of moving from the first position at which the cap member 130 closes the guide hole 120*a* to the second position at which the cap member 130 opens the guide hole 120*a* in accordance with the discharge pressure P of the target fluid. The present disclosure is not restricted or limited by the structure of the cap member 130.

In some implementations, the cap member 130 may include: a cap body 132 configured to be rectilinearly movable from the first position to the second position along the guide hole 120*a*; and discharge holes 134 provided in the cap body 132 and configured to communicate with the guide hole 120*a* and be selectively exposed to the outside of the retainer member 120 in response to the rectilinear movement of the cap body 132.

The cap body 132 may have various structures that may move upward or downward along the guide hole 120*a*. The present disclosure is not restricted or limited by the structure and shape of the cap body 132.

For example, the cap body 132 may have an approximately cylindrical shape having a diameter corresponding to the guide hole 120*a*.

The cap body 132 may be made of a typical synthetic resin or metallic material. The present disclosure is not restricted or limited by the material of the cap body 132.

The discharge hole 134 may have various structures capable of communicating with the guide hole 120*a*. The present disclosure is not restricted or limited by the structure of the discharge hole 134 and the number of discharge holes 134.

In some implementations, the discharge hole 134 may be closed by an inner wall surface of the guide hole 120*a* when the cap member 130 is moved to the first position. The discharge hole 134 may be emerged to the outside of the guide hole 120*a* and exposed to the outside of the retainer member 120 when the cap member 130 is moved to the second position.

For example, the discharge hole 134 is provided through a sidewall portion of the cap body 132. Therefore, one end of the discharge hole 134 may be exposed to an inner surface of the sidewall portion of the cap body 132, and the other end of the discharge hole 134 may be exposed to an outer surface of the sidewall portion of the cap body 132.

Hereinafter, an example will be described in which a plurality of (e.g., four) discharge holes 134 is radially disposed around a center of the cap body 132.

Figure 5:
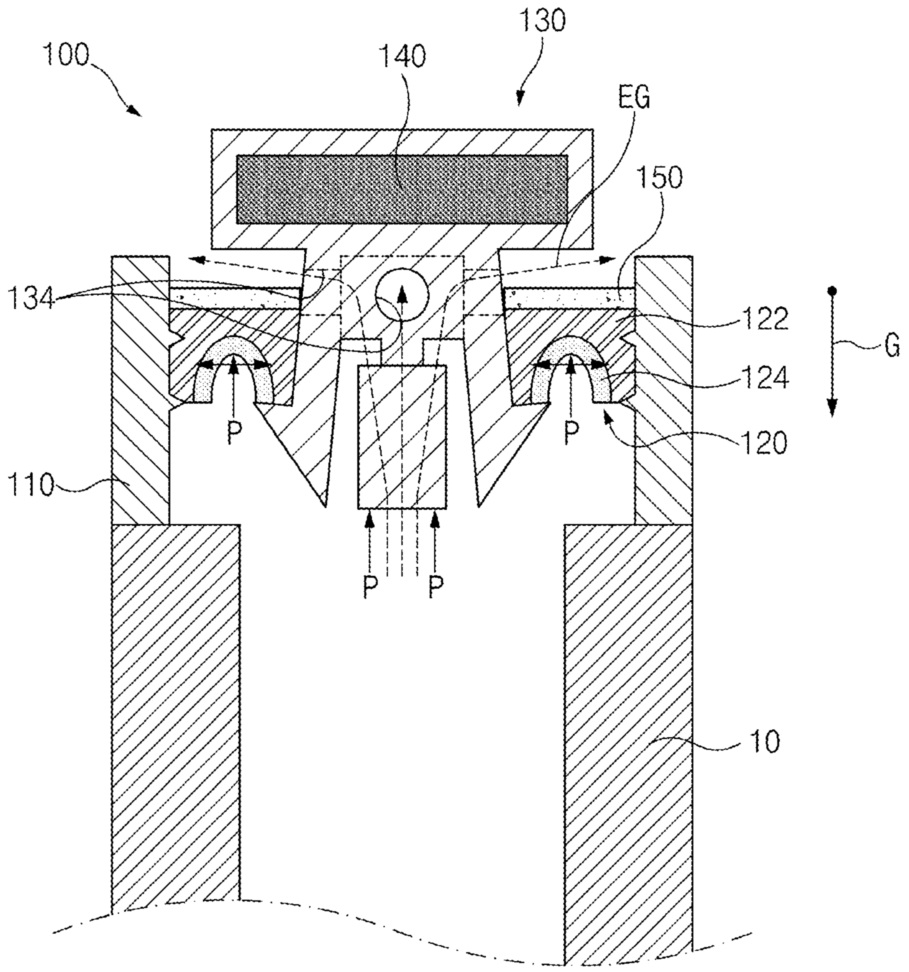
FIG. 5 is a view for explaining an example of a target fluid discharged from the cap assembly.

Referring to FIGS. 1 and 5, in some implementations, a discharge chamber 134a may be provided at an approximately central portion of the cap member 130 and communicate with the guide hole 120*a*. The plurality of discharge holes 134 may be connected to the discharge chamber 134*a* in common. With the above-mentioned structure, a target fluid EG introduced into the guide hole 120*a* along the fitting tube 110 may be dispersed to the discharge holes 134 via the discharge chamber 134*a* and then discharged to the outside of the retainer member 120 (an upper side of the retainer member) along the discharge holes 134.

As described above, the target fluid EG introduced into the guide hole 120*a* is dispersed to the discharge holes 134 via the discharge chamber 134*a*. Therefore, it is possible to obtain an advantageous effect of uniformly distributing, to each of the discharge holes 134, the discharge amount and the discharge pressure P of the target fluid EG discharged along the discharge holes 134.

In some implementations, the cap assembly 100 may include a cap head 136 provided at an upper end of the cap body 132 and having a cross-sectional area larger than the guide hole 120*a*.

For example, the cap head 136 may be provided in the form of an approximately circular plate having a larger diameter than the guide hole 120*a*.

As described above, the cap head 136 is provided at the upper end of the cap body 132, and the cap head 136 is restricted by the upper surface of the retainer member 120 when the cap member 130 is moved to the first position. Therefore, it is possible to obtain an advantageous effect of stably maintaining an arrangement state of the cap member 130 disposed at the first position and inhibiting the cap member 130 from separating downward from the retainer member 120.

In some implementations, the cap assembly 100 may include cap legs 138 provided at a lower end of the cap body 132 and configured to be restricted by the bottom surface of the retainer member 120. The cap legs 138 may prevent the cap member 130 from separating from the retainer member when the cap member 130 is moved from the first position to the second position.

Hereinafter, an example will be described in which a plurality of (e.g., four) cap legs 138 is radially disposed around a center of the cap body 132. In some implementations, three or fewer cap legs may be connected to the cap body, or five or more cap legs may be connected to the cap body.

The cap leg 138 may have various structures capable of preventing the cap member 130 from separating upward from the retainer member 120. The present disclosure is not restricted or limited by the structure of the cap leg 138.

In some implementations, the cap leg 138 may include: a leg main body **138*a* connected to the lower end of the cap body 132 and accommodated in the guide hole 120*a*; and a leg protrusion 138*b* provided at an end of the leg main body 138a and configured to be restricted by the bottom surface of the retainer member 120**.

For example, the leg main body **138*a* may be connected to the lower end of the cap body 132 and have an approximately straight shape. The leg protrusion 138*b* may protrude from an outer surface of the end of the leg main body 138**a and have an approximately triangular shape.

In some implementations, the cap leg 138 may be disposed to pass through the guide hole **120*a* downward from above the retainer member 120** in a snap-fit fastening manner.

The weight member 140 is provided in the cap member 130 and applies a load to the cap member 130 in the gravitational direction G so that the cap member 130 moves (downward) to the first position when the discharge pressure P applied to the cap member 130 by the target fluid is eliminated.

In this case, the configuration in which a load is applied to the cap member 130 in the gravitational direction G is defined as a configuration in which a load of the weight member 140 is applied to the cap member 130 in the gravitational direction (the upward/downward direction) G.

That is, the weight member 140 may apply a load to the cap member 130 so that the cap member 130 returns back to the first position when the discharge pressure P applied to the cap member 130 by the target fluid is eliminated in the state in which the cap member 130 is moved to the second position.

In some implementations, the configuration in which the weight member 140 is provided in the cap member 130 is defined as including both a configuration in which the weight member 140 is integrally accommodated in the cap member 130 and a configuration in which the weight member 140 is separably coupled (or fastened) to an outer portion (an outer surface) of the cap member.

The weight member 140 may have various structures in accordance with conditions and design specifications. The present disclosure is not restricted or limited by the structure of the weight member 140.

For example, the weight member 140 may be integrally accommodated in the cap member 130 and have an approximately circular plate shape. In some implementations, the weight member may have other shapes such as a cylindrical counterweight shape, a linear shape, or a ring-shaped counterweight shape. Alternatively, the weight member may be configured by stacking a plurality of weight members.

The weight member 140 may be variously changed in weight in consideration of a weight of the cap member 130 and the discharge pressure P applied to the cap member 130 by the target fluid. The present disclosure is not restricted or limited by the weight of the weight member 140.

In some implementations, the cap assembly 100 may include a fluid contact surface **124*a* provided on the retainer guide 124. The fluid contact surface 124*a* may come into contact with the target fluid and press the sealing member 122 toward an inner surface of the fitting tube 110**.

The fluid contact surface **124*a* allows the discharge pressure P made by the target fluid to press (compress) the sealing member 122 toward the inner surface of the fitting tube 110, such that the retainer member 120 may be more securely supported on the inner surface of the fitting tube 110**.

The fluid contact surface **124*a* may have various structures capable of being in contact with the target fluid. The present disclosure is not restricted or limited by the structure and shape of the fluid contact surface 124*a***.

Figure 3:
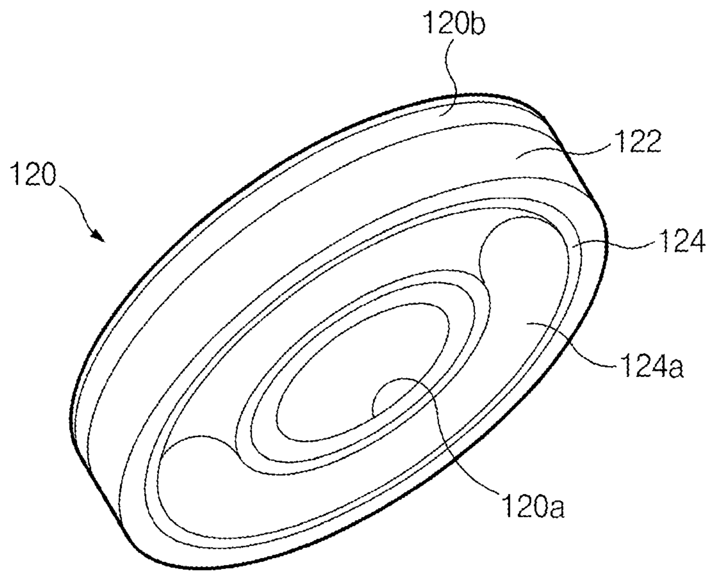
Figure 4:
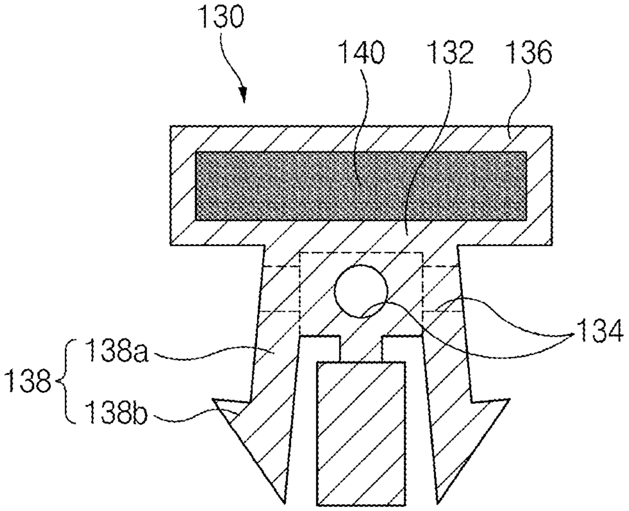
FIG. 4 is a view showing an example of the cap member of the cap assembly.

For example, referring to FIGS. 3 and 5, the fluid contact surface **124*a* may defined as a curved surface (e.g., a U shape) provided on the bottom surface of the retainer guide 124**.

As described above, when the discharge pressure P made by the target fluid is applied to the fluid contact surface **124*a*, the retainer guide 124 is spread in a leftward/rightward direction, such that the sealing member 122 may come into close contact with a lateral surface of the cap body 132, and the sealing member 122 may be pressed against the inner surface of the fitting tube 110. Therefore, it is possible to minimize a gap between the sealing member 122 and the cap body 132 (or the cap leg) and securely and stably support the arrangement state of the retainer member 120**.

Figure 6:
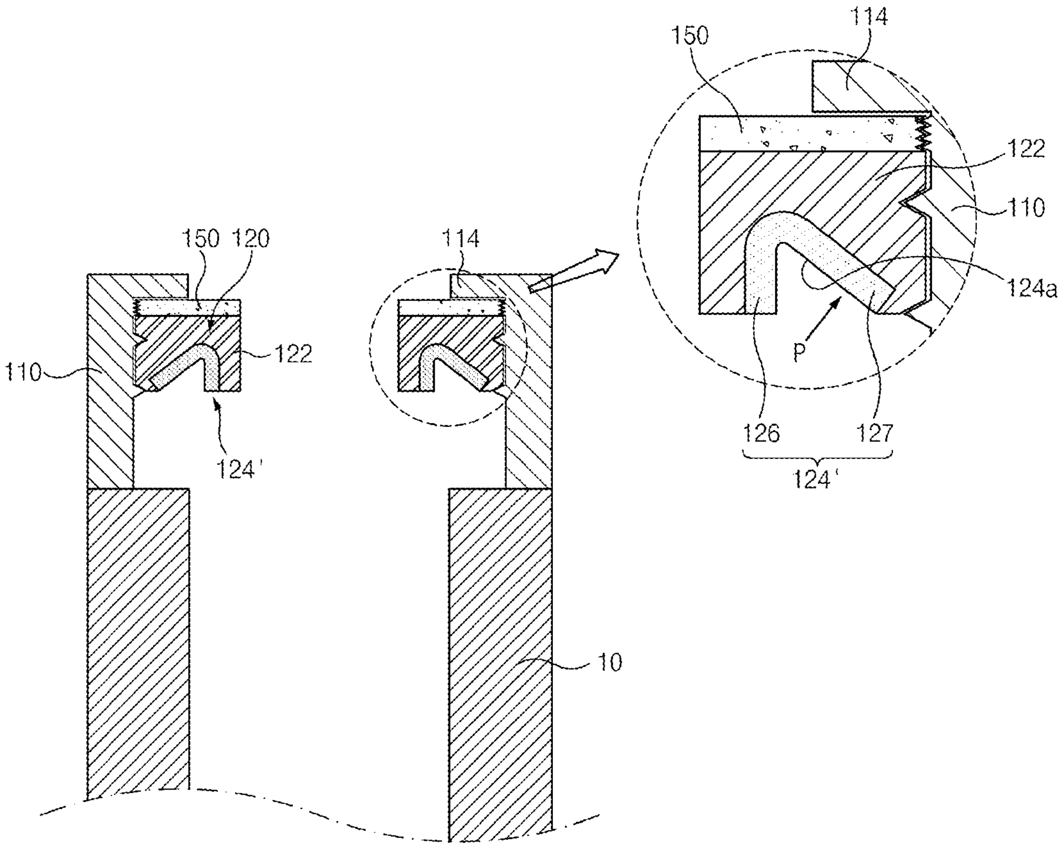
FIGS. 6 and 7 are views showing an example of a retainer guide of the cap assembly.

As another example, referring to FIG. 6, a retainer guide 124' may include: a vertical guide portion 126 disposed in a gravitational direction; and an inclined guide portion 127 connected to an end of the vertical guide portion 126 so as to be inclined with respect to the vertical guide portion 126 and configured to define the fluid contact surface **124*a***.

The vertical guide portion 126 and the inclined guide portion 127 may collectively define an approximately "V" shape.

As described above, the retainer guide 124' includes the vertical guide portion 126 and the inclined guide portion 127, and the fluid contact surface **124*a* is defined only by the inclined guide portion 127, such that the pressure applied to the retainer guide 124' may be concentrated on the inclined guide portion 127 and the sealing member 122 may be effectively pressed against the inner surface of the fitting tube 110. Therefore, it is possible to more securely and stably support the arrangement state of the retainer member 120**.

Moreover, because the inclined guide portion 127 is provided in the retainer guide 124', a force applied to the retainer guide 124' in the vertical direction (the upward/downward direction) may be minimized (dispersed). Therefore, it is possible to obtain an advantageous effect of more stably maintaining the arrangement state of the retainer member 120 while inhibiting the separation of the retainer member 120 caused by the force applied to the retainer guide 124' in the vertical direction.

In some implementations, as described above, the retainer guide 124' includes both the vertical guide portion 126 and the inclined guide portion 127. However, in some implementations, the retainer guide may include only the inclined guide portion without having the vertical guide portion.

Figure 7:
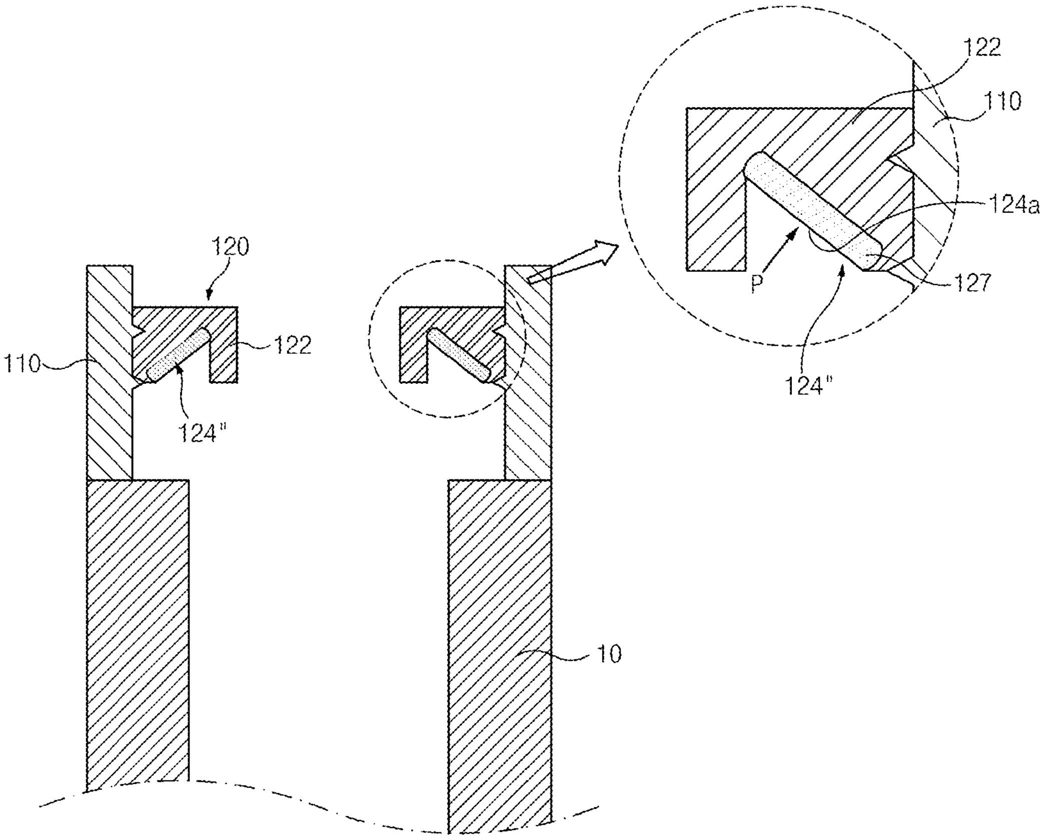

Referring to FIG. 7, in some implementations, a retainer guide 124" may include only the inclined guide portion 127, which is inclined with respect to the gravitational direction and configured to define the fluid contact surface 124*a*, without having a separate vertical guide portion (see 126 in FIG. 6).

Figure 2:
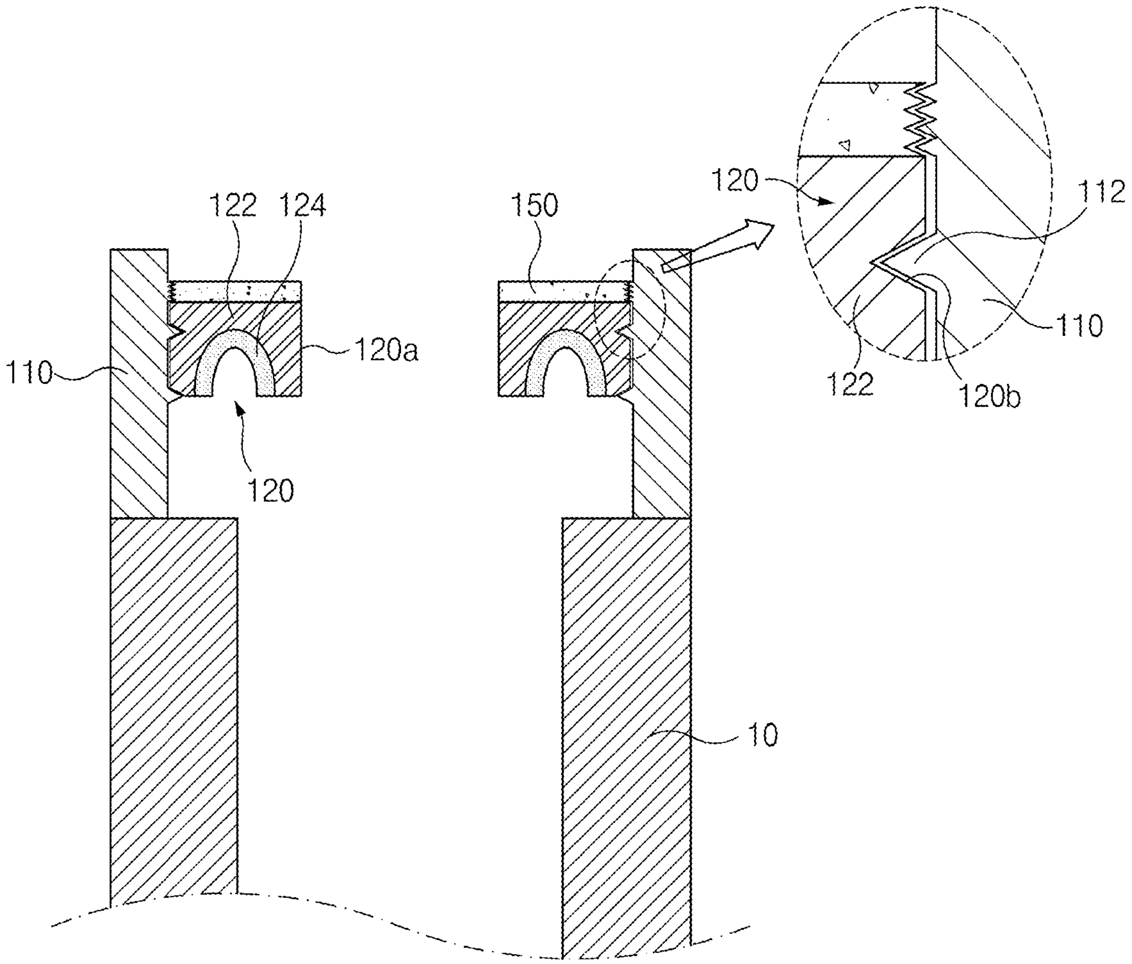
FIGS. 2 and 3 are views showing an example of a retainer member of the cap assembly.

Referring to FIG. 2, in some implementations, the cap assembly 100 may include: a restriction protrusion 112 provided on the inner surface of the fitting tube 110 (or the outlet end of the discharge line); and a restriction groove 120b provided in the retainer member 120 and configured to accommodate the restriction protrusion 112.

The restriction protrusion 112 may have various structures capable of being accommodated in the restriction groove 120*b*. The present disclosure is not restricted or limited by the structure and shape of the restriction protrusion 112. For example, the restriction protrusion 112 may have an approximately triangular shape.

The restriction groove 120*b* may be recessed in a lateral surface of the sealing member 122 and have a shape corresponding to the restriction protrusion 112.

Because the restriction protrusion 112 is accommodated in the restriction groove 120*b* as described above, it is possible to obtain an advantageous effect of minimizing the movement (separation) of the retainer member 120 relative to the fitting tube 110 and more securely supporting the arrangement state of the retainer member 120.

In some implementations, the restriction groove may be provided in the inner surface of the fitting tube, and the restriction protrusion may be provided on the lateral surface of the sealing member.

Referring to FIGS. 2 and 5, in some implementations, the cap assembly 100 may include a fastening member 150 fastened to the fitting tube 110 (or the outlet end of the discharge line) and configured to restrict the upper surface of the retainer member 120.

Various members capable of being fastened to the fitting tube 110 may be used as the fastening member 150. The present disclosure is not restricted or limited by the type and fastening structure of the fastening member 150. For example, a ring-shaped washer having a diameter corresponding to an inner diameter of the fitting tube 110 may be used as the fastening member 150.

In some implementations, the cap assembly 100 may include: a first screw thread portion provided on an outer peripheral surface of the fastening member 150; and a second screw thread portion provided on an inner peripheral surface of the fitting tube 110 and configured to engage with the first screw thread portion.

For example, the first screw thread portion may be provided as an internal thread, and the second screw thread portion may be provided as an external thread. The second screw thread portion may be fastened to the first screw thread portion as the fastening member 150 is rotated relative to the fitting tube 110. In some implementations, the first screw thread portion may be provided as an external thread, and the second screw thread portion may be provided as an internal thread.

As described above, the upper surface of the retainer member 120 is restricted by the fastening member 150 fastened (fixed) to the fitting tube 110. Therefore, it is possible to inhibit the movement (separation) of the retainer member 120 relative to the fitting tube 110 and more securely support the arrangement state of the retainer member 120.

In addition, referring to FIG. 6, in some implementations, the cap assembly 100 may include a stopper protrusion 114 provided at an end of the fitting tube 110 (or the outlet end of the discharge line) and configured to restrict the upper surface of the retainer member 120.

The stopper protrusion 114 may have various structures capable of restricting the upper surface of the retainer member 120 (or the upper surface of the fastening member 150).

The present disclosure is not restricted or limited by the structure of the stopper protrusion 114.

For example, a plurality of stopper protrusions 114 may be provided on an inner surface of the end of the fitting tube 110 and spaced apart from one another at predetermined intervals. In some implementations, stopper protrusions may be provided in the form of a continuous ring in a circumferential direction of the fitting tube.

In some implementations, as described above, the cap assembly has both the fastening member 150 and the stopper protrusion 114. However, in some implementations, the cap assembly may have only the stopper protrusion without having the fastening member.

Figure 8:
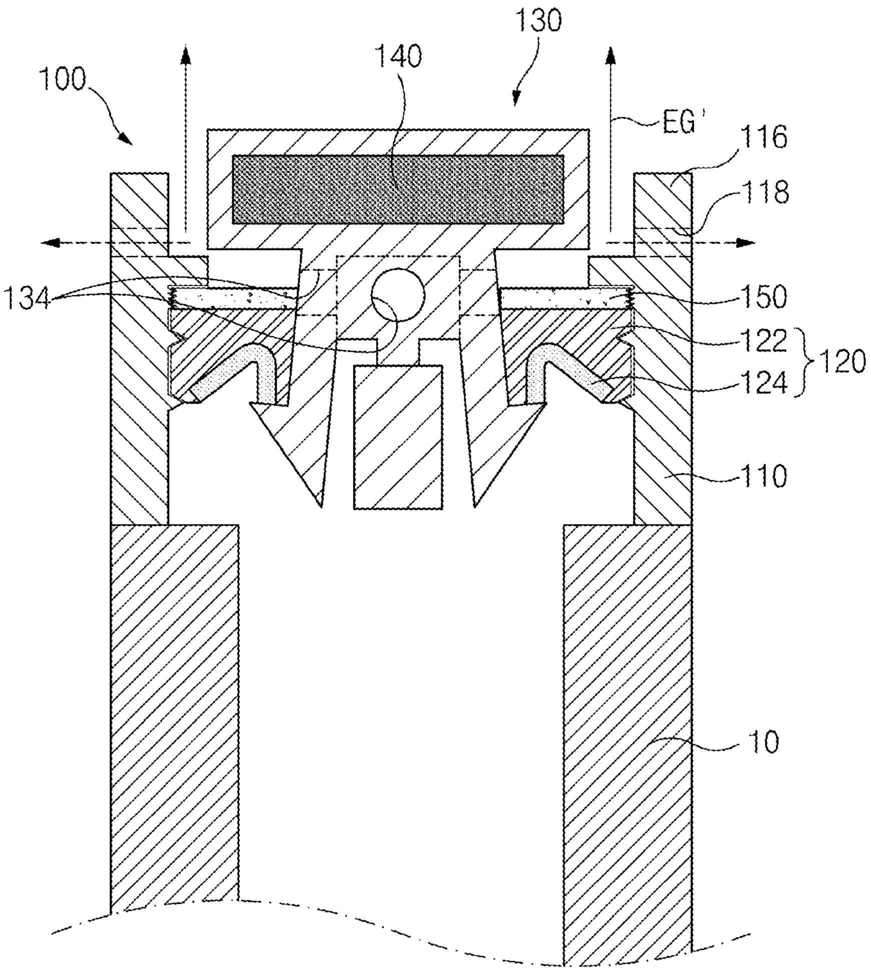
FIG. 8 is a view showing an example of an extension tube portion and a ventilation hole of the cap assembly.

Referring to FIG. 8, in some implementations, the cap assembly 100 may include an extension tube portion 116 extending from an upper end of the fitting tube 110 (or the outlet end of the discharge line) and configured to guide the target fluid, which has passed through the cap member 130, upward from the retainer member 120.

For example, the extension tube portion 116 may be provided at an uppermost end of the fitting tube 110 and have a straight shape. Alternatively, the extension tube portion may have a curved shape or other shapes.

Because the extension tube portion 116 is provided at the upper end of the fitting tube 110 as described above, a target fluid EG' having passed through the discharge hole 134 may be guided upward. Therefore, it is possible to meet the regulations associated with the discharge direction of the target fluid (e.g., hydrogen).

In addition, referring to FIG. 8, in some implementations, the cap assembly 100 may include a ventilation hole 118 provided in the extension tube portion 116.

For example, a plurality of ventilation holes 118 may be provided in the extension tube portion 116 and spaced apart from one another in the circumferential direction of the fitting tube 110.

As described above, the ventilation hole 118 is provided in the extension tube portion 116, such that the ventilation hole 118 may minimize the amount of moisture or water remaining between the cap member 130 and the extension tube portion 116 in the state in which the cap member 130 is disposed at the first position (the state in which the cap member 130 closes the guide hole). Therefore, it is possible to obtain an advantageous effect of preventing the cap member 130 from being frozen by moisture.

As described above, it is possible to obtain an advantageous effect of effectively protecting the outlet end of the discharge line while ensuring a stable discharge of the target fluid through the outlet end of the discharge line.

In particular, it is possible to obtain an advantageous effect of stably protecting the outlet end of the discharge line without performing a separate additional assembling process after the outlet end of the discharge line is opened once.

Among other things, when the target fluid is completely discharged through the outlet end of the discharge line, the cap member may be autonomously moved by the weight of the cap member back to the position at which the discharge line is closed.

In addition, it is possible to obtain an advantageous effect of preventing a loss of the cap member.

In addition, it is possible to obtain an advantageous effect of improving safety and reliability while inhibiting foreign substances from being introduced into the discharge line.

While the implementations have been described above, the implementations are just illustrative and not intended to limit the present disclosure. It can be appreciated by those skilled in the art that various modifications and applications, which are not described above, may be made to the present implementation without departing from the intrinsic features of the present implementation. For example, the respective constituent elements specifically described in the implementations may be modified and then carried out. Further, it should be interpreted that the differences related to the modifications and applications are included in the scope of the present disclosure defined by the appended claims.

What is claimed is:

1. A cap assembly comprising:

a retainer member configured to be disposed at an outlet end of a discharge line, wherein the discharge line is configured to discharge a target fluid to an outside of the retainer member in a gravitational direction, the retainer member defining a guide hole configured to guide the target fluid to the outside;

a cap member configured to move relative to the retainer member to thereby open and close the guide hole, the cap member being configured to, based on a discharge pressure of the target fluid applied to the cap member, move from a first position at which the cap member closes the guide hole to a second position at which the cap member opens the guide hole; and a weight member disposed at the cap member and configured to apply a load to the cap member to thereby cause the cap member to move to the first position based on the discharge pressure being eliminated, wherein the cap member comprises:

a cap body configured to linearly move from the first position to the second position along the guide hole, the cap body defining a discharge hole configured to fluidly communicate with the guide hole and be selectively exposed to the outside of the retainer member based on the cap body moving from the first position to the second position.

2. The cap assembly of claim 1, wherein the cap member comprises an inner wall surface that defines the guide hole and is configured to close the discharge hole based on the cap member moving to the first position, and wherein the discharge hole is configured to move outward from the guide hole and be exposed to the outside of the retainer member based on the cap member moving to the second position.

3. The cap assembly of claim 1, further comprising:

a cap head disposed at an upper end of the cap body, wherein a cross-sectional area of the cap head is larger than the guide hole.

4. The cap assembly of claim 1, further comprising:

a cap leg disposed at a lower end of the cap body and configured to be restricted by a bottom surface of the retainer member, the cap leg being configured to restrict the cap member from separating from the retainer member based on the cap member moving from the first position to the second position.

5. The cap assembly of claim 4, wherein the cap leg comprises:

a leg main body connected to the lower end of the cap body and accommodated in the guide hole; and a leg protrusion disposed at an end of the leg main body and configured to be restricted by the bottom surface of the retainer member.

6. The cap assembly of claim 1, wherein the retainer member comprises:

a sealing member that defines the guide hole and is configured to be disposed in the discharge line, the sealing member being configured to elastically expand and be compressed; and a retainer guide that covers a bottom surface of the sealing member.

7. The cap assembly of claim 6, further comprising:

a fluid contact surface disposed at the retainer guide and configured to come into contact with the target fluid, the fluid contact surface being configured to press the sealing member toward an inner surface of the discharge line.

8. The cap assembly of claim 7, wherein the retainer guide further comprises:

a vertical guide portion that extends in the gravitational direction; and an inclined guide portion connected to an end of the vertical guide portion and inclined with respect to the vertical guide portion, the inclined guide portion defining the fluid contact surface.

9. The cap assembly of claim 7, wherein the retainer guide further comprises an inclined guide portion inclined with respect to the gravitational direction, the inclined guide portion defining the fluid contact surface.

10. The cap assembly of claim 1, further comprising:

a fitting tube configured to be connected to the outlet end of the discharge line, wherein the retainer member is disposed in the fitting tube.

11. The cap assembly of claim 1, wherein the retainer member defines a restriction groove configured to accommodate a restriction protrusion disposed at the outlet end of the discharge line.

12. The cap assembly of claim 10, wherein the fitting tube comprises a restriction protrusion that protrudes from an inner surface of the fitting tube, and wherein the retainer member defines a restriction groove configured to accommodate the restriction protrusion.

13. The cap assembly of claim 1, further comprising:

a fastening member coupled to the outlet end of the discharge line and configured to restrict an upper surface of the retainer member.

14. The cap assembly of claim 10, further comprising:

a fastening member coupled to the outlet end of the discharge line or the fitting tube, the fastening member being configured to restrict an upper surface of the retainer member.

15. The cap assembly of claim 1, further comprising:

a stopper protrusion disposed at the outlet end of the discharge line and configured to restrict an upper surface of the retainer member.

16. The cap assembly of claim 10, further comprising:

a stopper protrusion disposed at an end of the fitting tube and configured to restrict an upper surface of the retainer member.

17. The cap assembly of claim 1, further comprising:

an extension tube portion disposed at the outlet end of the discharge line and configured to guide the target fluid having passed through the cap member, the extension tube portion extending above the retainer member.

18. The cap assembly of claim 10, further comprising:

an extension tube portion that extends from an upper end of the fitting tube and configured to guide the target fluid having passed through the cap member, the extension tube portion extending above from the retainer member.

19. The cap assembly of claim 17, wherein the extension tube portion defines a ventilation hole in fluid communication with the outlet end of the discharge line.

20. A cap assembly comprising:

a retainer member configured to be disposed at an outlet end of a discharge line, wherein the discharge line is configured to discharge a target fluid to an outside of the retainer member in a gravitational direction, the retainer member defining a guide hole configured to guide the target fluid to the outside;

a cap member configured to move relative to the retainer member to thereby open and close the guide hole, the cap member being configured to, based on a discharge pressure of the target fluid applied to the cap member, move from a first position at which the cap member closes the guide hole to a second position at which the cap member opens the guide hole; and a weight member disposed at the cap member and configured to apply a load to the cap member to thereby cause the cap member to move to the first position based on the discharge pressure being eliminated, wherein the retainer member defines a restriction groove configured to accommodate a restriction protrusion disposed at the outlet end of the discharge line.

* * * * *